Figure 1:
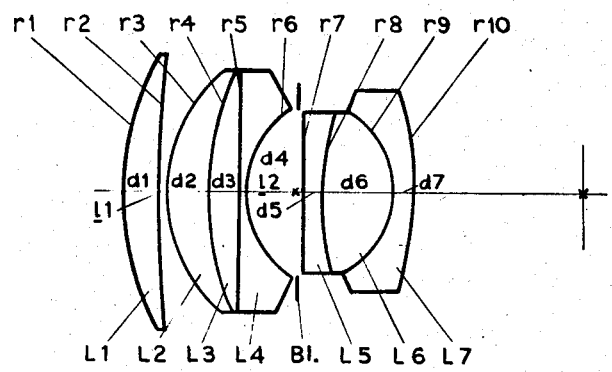

June 17, 1952  L. J. BERTELE  2,600,610
HIGH-APERTURE AND HIGH-TRANSMISSION
THREE COMPONENT OBJECTIVE
Filed April 15, 1950

INVENTOR.
LUDWIG J. BERTELE

Patented June 17, 1952

2,600,610

UNITED STATES PATENT OFFICE 2,600,610

HIGH-APERTURE AND HIGH-TRANSMISSION THREE COMPONENT OBJECTIVE

Ludwig J. Bertele, Heerbrugg, Switzerland

Application April 15, 1950, Serial No. 156,214
In Switzerland May 11, 1949

5 Claims. (Cl. 88—57)

The present invention has for its object the provision of an increased aperture ratio for the objective type of lens assembly developed by me, as more particularly set out in my United States Patent No. 1,975,678 of October 2, 1934, and the corresponding German Patent No. 673,861 of April 1, 1939.

Throughout this specification and the claims the object will be regarded as being at the side of the objective having the longer conjugate and the image at the side having the shorter conjugate. Numbering of elements must be understood as commencing from the object side, as is usual.

The foregoing objective type of lens assembly consists primarily of three air-space separated components, of which two collective components surround a lens component convex toward the object. The air space separating the first and second components has the form of a dispersive lens convex toward the object; the air space separating the second and third components has the form of a collective lens having its side of greater curvature directed toward the object. The individual components are partly composed of individual lenses which are best cemented together.

With the possibility of making the lens surface less reflective by the application of reflection reduction coatings, one or more of the surfaces between adjacent elements may be left uncemented, and as a consequence within the individual components there may also be included air layers of slight thickness. The delimitation surfaces thereof forming these air lenses may also have small radius differences. In the lens system aforesaid the lenses $L6$ and $L7$ must nonetheless be always cemented in order to avoid any total reflection of the light rays participating in the formation of the image.

The first component is generally a simple collective lens $L1$. The second component consists of three individual lenses ($L2$, $L3$, $L4$), which may or may not be cemented, constituting a lens component which is meniscus-shaped convex toward the object. The refractive index for the $d$-line of the lens $L3$ is at least 0.12 smaller than the refractive index of the lens $L2$ or $L4$. The lenses $L2$ and $L3$ have positive whereas the lens $L4$ has negative refractive power. The third component is cemented and consists of at least a positive lens $L6$ and a negative lens $L7$ so that a highly convex cemented surface exists toward the image; the refractive index in front of this cemented surface is at least 0.03 larger than behind this surface. The examples which are given have also a negative lens $L5$ which is cemented and has a lower refractive index than $L6$.

With the presently known forms of execution of this construction, it has been possible to obtain an aperture ratio of f/1.5 for a field of view of about 45°.

In carrying out the object of the present invention to obtain an increased aperture ratio, it has been found that by increasing the refractive index of the lens forming the first component and that of the next following lens element of meniscus-like contour to such an extent that the sum of the two refractive indices for the $d$-line is higher than 3.375, this goal is achieved.

The limitation of the benefits obtainable are those occasioned by the maximum refractive indices of the available kinds of glass. On the basis of the present-day available glass, it is possible to raise the foregoing refractive index sum to about 3.53.

With a sufficiently high refractive index sum within the range indicated, it has been found that the definition of the image will not suffer by reason of raising the aperture ratio to f/1.4.

The features of the invention will be made clearer or become more readily apparent from the appended drawing in which Figures 1 to 4 diagrammatically illustrate the outline at the axial section of the objectives in accordance with the present invention, as exemplified in Tables I to IV, respectively.

Making reference to the drawings, there are illustrated four objectives coming within the scope of the invention claimed. The illustrations refer to a focal length of 100 mm. and the examples given refer to a field of view of 45°.

In the examples and tables given hereinbelow:

$L$=the lenses;
$r$=the radius;
$d$=the thickness;
$l$=the air space; the number in each case being the ordinal member of the relative element or dimension counting from the front;
$B1$=the diaphragm.

The kinds of glass are designated in the last two columns by their refractive indices $n_d$ for the $d$-line and the Abbé dispersion numbers $v$.

Referring first to Figure 1, the lens system in left to right sequence is: the nearly plano-convexo lens L1 ($d1$) having the convex face $r1$ and the nearly plane face $r2$; the lens L2 ($d2$) having the convex face $r3$ and the concave face $r4$; the lens L3 ($d3$) having the contiguous face $r4$ and the nearly plane face $r5$; the nearly plano-concave lens L4 ($d4$) having the contiguous nearly plane face $r5$ and the concave face $r6$; B1 is the iris or diaphragm; the lens L5 ($d5$) having the plane face $r7$ and the concave face $r8$; the lens L6 ($d6$) having the contiguous face $r8$ and the convex face $r9$; the lens L7 ($d7$) is a meniscus lens having the concave contiguous face $r9$ and the convex face $r10$.

Figure 2:
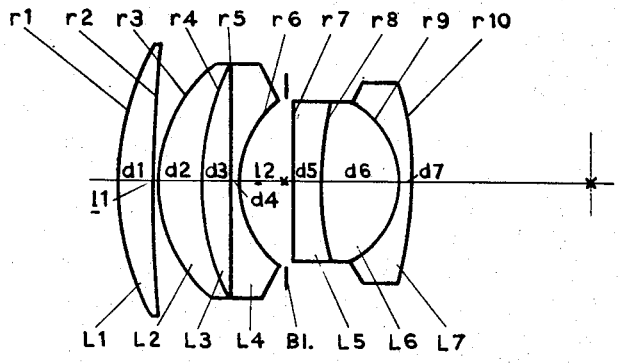
Figure 3:
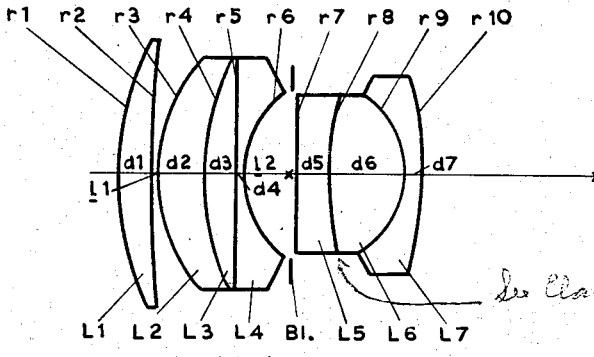

In Figures 2 and 3 corresponding parts have been correspondingly identified.

Figure 4:
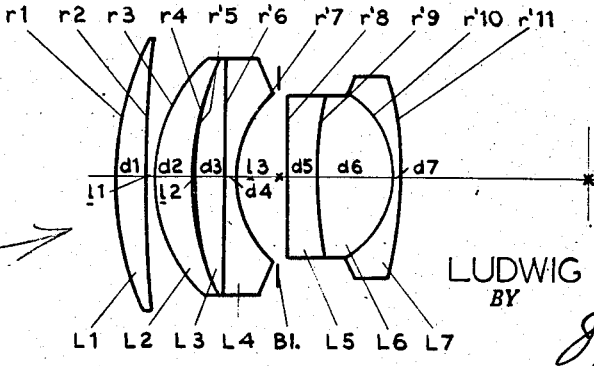

In Figure 4 and in the Table IV directed to this form, the variants in the reference characters are introduced by the lack of complete contact of lenses L2 and L3 to provide the air space $l2$ but in other respects the lenses L3, L4, L5, L6 and L7 are of the same character as previously described.

EXAMPLE I (Figure 1)

An objective with an aperture ratio of f/1.44. This objective consists of three lens components, of which L1 is a simple lens, L2—L3—L4 form a lens component which is cemented and which is a meniscus-like composite convex toward the object. L5—L6—L7 form a cemented collective lens component. The refractive index of lens L3 is 0.205 smaller than the refractive index of lens L2 and 0.235 smaller than the refractive index of lens L4. The refractive index of lens L6 is 0.155 higher than the refractive index of lens L5 and 0.056 higher than the refractive index of L7. The sums of the refractive indices of the first and second lens L1 and L2 is 3.38. The sum of the reciprocals of the radii of curvature of the front surfaces of the first two components diminished by the reciprocal of the radius of curvature of the rear surface of the front component is 0.03821, which is $$\frac{3.821}{f}$$

when expressed in terms of the focal length $f$ of the complete objective.

EXAMPLE II (Figure 2)

An objective with an aperture ratio of f/1.44. The lens succession is the same as in Example I. The refractive index of lens L3 is 0.244 smaller than the refractive index of lens L2 and 0.228 smaller than the refractive index of lens L4. The refractive index of lens L6 is 0.194 higher than the refractive index of lens L5 and 0.066 higher than the refractive index of lens L7. The sum of the refractive indices of the first and second lenses L1 and L2 is 3.461. The sum and difference of reciprocals calculated as in Example I is $$\frac{3.596}{f}$$

EXAMPLE III (Figure 3)

An objective with an aperture ratio of f/1.4.

The lens succession is the same as in the previous examples. The refractive index of lens L3 is 0.305 smaller than the refractive index of lens L2 and 0.228 smaller than the refractive index of lens L4. The refractive index of lens L6 is 0.194 higher than the refractive index of lens L5 and 0.066 higher than the refractive index of lens L7. The sum of the refractive indices of the first two lenses L1 and L2 is 3.522. The sum and difference of reciprocals calculated as in Example I is $$\frac{3.366}{f}$$

EXAMPLE IV (Figure 4)

An objective with an aperture ratio of f/1.4. In this example the individual lenses in the second meniscus-formed component are only partly cemented. The lens L2 is not cemented with the following lenses L3 and L4 but separated by a small air space $l2$. The other cemented surfaces as well (except that between lens L6 and lens L7) may be uncemented in whole or in part in a similar way. The refractive index of lens L3 is 0.244 smaller than the refractive index of lens L2 and 0.228 smaller than the refractive index of lens L4. The refractive index of lens L6 is 0.194 higher than the refractive index of lens L5 and 0.066 higher than the refractive index of lens L7. The sum of the refractive indices of the first two lenses L1 and L2 is 3.461. The sum and difference of reciprocals calculated as in Example I is $$\frac{3.596}{f}$$

Table I

|  |  | $d$ | $n_D$ | $v$ |
|---|---|---|---|---|
| L1 | $r1=+74.44$ | $d1=9.5$ | 1.6930 | 43.0 |
|  | $r2=+443.4$ | $l1=0.3$ |  |  |
| L2 | $r3=+36.99$ | $d2=11.9$ | 1.6929 | 52.4 |
| L3 | $r4=+78.85$ | $d3=7.75$ | 1.4875 | 70.0 |
| L4 | $r5=-804.6$ | $d4=1.8$ | 1.7229 | 28.5 |
|  | $r6=+24.06$ | $l2=14.9$ |  |  |
|  | $r7=\infty$ |  |  |  |
| L5 | $r8=+57.47$ | $d5=4.8$ | 1.5112 | 50.9 |
| L6 |  | $d6=19.5$ | 1.6666 | 48.4 |
| L7 | $r9=-22.41$ | $d7=5.0$ | 1.6072 | 56.7 |
|  | $r10=-102.8$ |  |  |  |

Table II

|  |  | $d$ | $n_D$ | $v$ |
|---|---|---|---|---|
| L1 | $r1=+80.08$ | $d1=8.8$ | 1.7170 | 47.9 |
|  | $r2=+379.5$ | $l1=0.3$ |  |  |
| L2 | $r3=+38.31$ | $d2=11.9$ | 1.7440 | 44.7 |
| L3 | $r4=+68.85$ | $d3=7.75$ | 1.5005 | 66.0 |
| L4 | $r5=-766.3$ | $d4=1.8$ | 1.7283 | 28.3 |
|  | $r6=+25.52$ | $l2=13.7$ |  |  |
| L5 | $r7=+958.0$ | $d5=7.7$ | 1.5231 | 50.9 |
| L6 | $r8=+78.5$ | $d6=20.7$ | 1.7170 | 47.9 |
| L7 | $r9=-24.1$ | $d7=3.6$ | 1.6510 | 58.6 |
|  | $r10=-120.1$ |  |  |  |

Table III

| | | d | $n_D$ | v |
|---|---|---|---|---|
| $L_1$ | $r1=+83.6$ | $d1=9.2$ | 1.7170 | 53.5 |
| | $r2=+396.2$ | $l1=0.3$ | | |
| | $r3=+41.28$ | | | |
| $L_2$ | | $d2=12.4$ | 1.8055 | 40.3 |
| | $r4=+71.88$ | | | |
| $L_3$ | | $d3=8.1$ | 1.5005 | 66.0 |
| | $r5=-800.0$ | | | |
| $L_4$ | | $d4=1.9$ | 1.7283 | 28.3 |
| | $r6=+26.48$ | | | |
| | | $l2=14.3$ | | |
| | $r7=+1000.0$ | | | |
| $L_5$ | | $d5=8.0$ | 1.5231 | 50.9 |
| | $r8=+82.0$ | | | |
| $L_6$ | | $d6=21.6$ | 1.7170 | 47.9 |
| | $r9=-24.95$ | | | |
| $L_7$ | | $d7=3.8$ | 1.6510 | 58.6 |
| | $r10=-109.9$ | | | |

Table IV

| | | d | $n_D$ | v |
|---|---|---|---|---|
| $L_1$ | $r1=+80.08$ | $d1=8.81$ | 1.7170 | 47.9 |
| | $r2=+379.5$ | $l1=0.29$ | | |
| | $r3=+38.31$ | | | |
| $L_2$ | | $d2=11.49$ | 1.7440 | 44.7 |
| | $r4=+68.85$ | | | |
| | | $l2=0.38$ | | |
| $L_3$ | $r'5=+70.88$ | $d3=7.66$ | 1.5005 | 66.0 |
| | $r'6=-766.3$ | | | |
| $L_4$ | | $d4=1.97$ | 1.7283 | 28.3 |
| | $r'7=+25.66$ | | | |
| | | $l3=13.7$ | | |
| | $r'8=+574.7$ | | | |
| $L_5$ | | $d5=7.66$ | 1.5231 | 50.9 |
| | $r'9=+78.54$ | | | |
| $L_6$ | | $d6=20.69$ | 1.7170 | 47.9 |
| | $r'10=-23.98$ | | | |
| $L_7$ | | $d7=1.72$ | 1.6510 | 58.6 |
| | $r'11=-127.1$ | | | |

Having thus described my invention and illustrated its use, what I claim as new and desire to secure by Letters Patent is:

1. In a high-aperture objective including essentially three components separated by air spaces, the first consisting of a simple converging lens facing the object, the second being a diverging component made up of at least three lenses which is highly convex toward the object, and the third being a converging triplet comprising a converging lens of high refractive index between two diverging lenses, the first air space being in the form of a diverging lens toward the object, and the second air space in the form of a converging lens with its less curved surface toward the image, the combination wherein the sum of the refractive indices for the d-line of the front component and of the front lens of the second component is greater than 3.375 and wherein the axial thickness of the second component is between 0.14 f and 0.30 f, where f denotes the equivalent focal length of the objective.

2. A high-aperture objective including essentially three components separated by air spaces, the first consisting of a simple converging lens facing the object, the second being a diverging component made up of at least three lenses which is highly convex toward the object, and the third being a converging triplet comprising a converging lens of high refractive index between two diverging lenses, the first air space being in the form of a diverging lens convex toward the object and the second air space in the form of a converging lens with its less curved surface toward the image, characterized by dimensions and refractive properties which simultaneously fulfill the three conditions, firstly that the second component has an axial length comprised within the range of 0.14 f to 0.30 f, where f denotes the total focal length of the objective, secondly that the sum of the reciprocals of the radii of curvature of the front surfaces of the first two components diminished by the reciprocal of the radius of curvature of the rear surface of the front component is comprised within the range of $$\frac{3.90}{f} \text{ to } \frac{3.0}{f}$$

and thirdly that the sum of the refractive indices for the d-line of the front component and of the front lens of the second component is greater than 3.375.

3. An objective as defined in claim 2 characterized in that the first two lens elements of one of the multiple lens components are separated by a thin air space convex toward the object.

4. An objective as defined in claim 2, characterized in that the first two lens elements of the second component are separated by a thin air space convex toward the object.

5. An objective as defined in claim 2, characterized in that the first two lens elements of the third component are separated by a thin air space convex toward the object.

LUDWIG J. BERTELE.

REFERENCES CITED

The following references are of record in the file of this patent:

UNITED STATES PATENTS

| Number | Name | Date |
|---|---|---|
| 1,975,678 | Bertele | Oct. 2, 1934 |
| 2,124,356 | Rayton | July 19, 1938 |
| 2,254,511 | Bertele | Sept. 2, 1941 |
| 2,282,677 | Rayton | May 12, 1942 |
| 2,433,438 | Cox | Dec. 30, 1947 |

FOREIGN PATENTS

| Number | Country | Date |
|---|---|---|
| 837,616 | France | Nov. 12, 1938 |
| 673,861 | Germany | Apr. 1, 1939 |